Patented Aug. 15, 1950

2,519,088

UNITED STATES PATENT OFFICE 2,519,088

AQUEOUS DDT PASTE

Isaac F. Walker, Hockessin, Del., assignor to E. I. du Pont de Nemours & Company, Wilmington, Del., a corporation of Delaware No Drawing. Application January 18, 1946, Serial No. 642,123

1 Claim. (Cl. 167—42)

This invention relates to insecticidal compositions comprising 1,1,1-trichloro-2,2-bis(p-chlorophenyl)ethane, the principal active material in DDT, the latter being the product obtained by condensation of chloral and chlorobenzene in the presence of sulfuric acid. More particularly, it relates to aqueous pastes containing DDT, of at least technical grade in purity, in high concentration.

A highly convenient mode of application of DDT is in the form of an aqueous dispersion free from organic solvents. Wherever transportation is a problem, such as in regions difficult of access, it is practically essential to use DDT as aqueous suspensions since other liquid carriers such as organic solvents or oils would occupy valuable transport space. Aqueous suspensions of DDT are also highly desirable for many household or agricultural uses because of their cheapness and lack of fire hazard.

Ever since the insecticidal properties of DDT have become known, methods have been sought whereby aqueous dispersions of DDT of the normally desired low DDT content (e. g., 1% to 5%) could be prepared by simple dilution with water of aqueous concentrates containing high proportions of the active material. The advantages of such a procedure are obvious since it avoids the shipment of dilute formulations, permits the preparation of dispersions of low DDT content with the simplest kind of mixing and stirring equipment, and eliminates the inconvenience and possible hazards of handling finely divided concentrated DDT powders. However, attempts at preparing aqueous DDT concentrates have heretofore been unsuccessful in that it has not been possible to obtain aqueous suspensions or pastes containing high proportions of DDT, e. g., at least 50% by weight, which remain stable (i. e., non-sedimented, uncaked, and water-dispersible) upon storage either at ordinary temperature or at elevated temperature, e. g., 50–65° C.

This invention has as an object stable aqueous DDT concentrates. A further object is the preparation of non-caking water-dispersible concentrated aqueous DDT pastes. Other objects will appear hereinafter.

These objects are accomplished by the invention of aqueous pastes containing at least 50% by weight of DDT and minor proportions, of a surface-active agent and of a water-soluble polymeric protective colloid. This requirement for a surface-active agent and the water-soluble protective colloid is satisfied by the latter material alone in the case of those substances, for example, polyvinyl alcohol, which function both as surface active agents and as protective colloids. These water-soluble polymeric colloids that are used in the practice of this invention are those which, in 10% aqueous solution, have a viscosity of at least 10 centipoises at 25° C., and they should be employed in an amount (between 0.2% and 10% based on the water present in the paste) sufficient to give to the aqueous phase, exclusive of the surface-active agent, a viscosity of at least 10 centipoises at 25° C. The surface-active agent should be employed in amounts of about 0.1% to 10%, based on the weight of the DDT.

The improved pastes described above are prepared by appropriately blending, with the remaining components, pre-ground solid DDT, such form of DDT being essential for obtaining non-caking water dispersible pastes having the high concentration of DDT which characterizes the present compositions.

The invention is illustrated by the following examples, in which parts are by weight.

Example I

A mixture of 50 parts of finely divided (hammer-milled) technical DDT, 45 parts of water, 4 parts of sodium lignin sulfonate as the surface-active agent, and 1 part of dextrin as the protective colloid (i. e., suspending or thickening agent) is stirred to a smooth paste. After 16 hours' storage at 55° C., the paste shows no sign of sedimentation or caking and is readily dispersible in water on simple hand stirring. A control composition containing no dextrin is badly caked under the same test conditions and cannot be dispersed in water.

Example II

An aqueous formulation containing 58% of DDT is prepared by stirring until homogeneous a mixture of 50 parts of finely divided technical DDT, 34 parts of water, 2 parts of a 5% solution of deacetylated chitin in dilute acetic acid (equivalent to about a 7% solution of deacetylated chitin acetate) and 1 part of sodium petroleum sulfonate. The paste does not cake after 128 hours' storage at 55° C. and it is then readily dispersible in water to give suspensions suitable for spraying.

Example III

A mixture of 50 parts of finely divided technical DDT, 2 parts of polyvinyl alcohol (high viscosity, 85% hydrolized polyvinyl acetate), and 45 parts of water is stirred to a smooth paste. After being stored for one week at 55° C., the paste is readily dispersible in additional water and shows no sign of caking. A similar paste prepared without the polyvinyl alcohol sets to a solid in 18 hours at 55° C. and is not redispersible. In this case, the polyvinyl alcohol acts both as a surface-active agent and as a protective colloid preventing sedimentation.

Example IV

Aqueous DDT concentrates are prepared by stirring together the following ingredients: Recrystallized DDT of melting point 106° C., air-micronized to a particle size of 1 to 10 microns; polyvinyl alcohol (high viscosity, 85% hydrolyzed polyvinyl acetate); "Nacconol FSNO" (alkylated benzene sodium sulfonate); and water, in the respective proportions:

(a) 100/1.25/1.25/47.5 (66.6% DDT)
(b) 100/0.5/1.25/48.25 (66.6% DDT)
(c) 100/1.25/0.25/43.5 (69% DDT)

After 6 days at 55° C. all three pastes are entirely free from caked material and easily dispersible in water. In comparison, a control from which the anti-caking protective colloid is omitted (consisting of 100 parts DDT, 0.25 part "Nacconol FSNO," and 66.25 parts water) is caked and granular after 6 days at 55° C. and cannot be dispersed in additional water.

Example V

An aqueous paste containing 73% of DDT is made by stirring until homogeneous 100 parts of DDT (M. P. 106° C.) air-micronized to a particle size of 1 to 10 microns, 1 part of "Igepon T" (sodium salt of the oleyl amide of methyltaurine, $C_{17}H_{33}CON(CH_3)C_2H_4SO_3Na$), 1 part of dextrin, and 35 parts of water. The thick paste is stable, i. e., non-caked and non-sedimented, after 6 days at 55° C. It is then readily dispersible in water.

Example VI

Two pastes are prepared by mixing the following ingredients: Recrystallized DDT of melting point 106° C., air-micronized to a particle size of 1 to 10 microns; "Triton 770" (sodium salt of aryl alkyl polyether sulfate), used as the 100% active material; "Daxad-11" (sulfonated naphthalene-formaldehyde condensation product); polyvinyl alcohol (high viscosity, 85% hydrolyzed polyvinyl acetate); and water, in the relative proportions:

(a) 100/2/1/0.5/35.5 (72% DDT)
(b) 100/4/1/0.5/37.5 (72% DDT)

Both pastes are relatively fluid when prepared. After 6 days at 55° C. their fluidity is the same and they are easily diluted with additional water to give dispersions suitable for spraying.

Example VII

One thousand (1000) parts of technical grade DDT, 1500 parts of water, and 40 parts sodium lignin sulfonate are ground in a ball mill for four days, after which time the DDT is composed mostly of particles smaller than 10 microns in diameter. This DDT slurry is concentrated by filtration to a cake containing 60% DDT by weight. Although a portion of the sodium lignin sulfonate is removed from the DDT with the filtrate, the wet cake, as judged by its color and dispersibility, still contains appreciable quantities. Thirty (30) parts of the filter cake are converted to a fluid paste by stirring with 4 parts of 10% aqueous polyvinyl alcohol solution. This paste is fluid and water-dispersible after 64 hours' storage at 55° C., while the filter cake not modified with the polyvinyl alcohol solution becomes a solid mass after 16 hours at 55° C.

Example VIII

Thirty (30) parts of the filter cake prepared as in Example VII is blended with 3½ parts of water and 0.1 part of locust bean gum to give a paste which is slightly fluid. After 64 hours' storage at 65° C., the product is still fluid and is dispersible in water.

Examples VII and VIII above illustrate the method of preparing the present concentrated aqueous DDT pastes wherein the DDT is ground in a ball mill with water and a surface-active agent, this grinding step being followed by filtration to concentrate the DDT somewhat, and finally by blending with a protective colloid. In some cases it is desirable in the grinding step to employ a lower concentration of surface-active agent, e. g., 0.5% on the DDT, since filtration would be difficult if the agent is highly effective and present in concentration in the neighborhood of 5%. In these instances in which only a limited amount of surface-active agent is employed in the ball mill, it is desirable to add an additional quantity in preparing the paste in order to insure that the DDT particles will be completely dispersed.

A further method which can be used in preparing the concentrated DDT pastes described herein consists in grinding a concentrated aqueous DDT slurry containing 50% or more DDT by weight in the presence of both the protective colloid and the surface-active agent. In this way the finally desired concentrated aqueous DDT paste is obtained directly in the ball mill operation. This method is illustrated by the following example:

Example IX

One hundred (100) parts of purified DDT melting above 106° C., 3 parts of "Igepon T" (the sodium salt of the oleic acid amide of N-methyltaurine), 1 part of dextrin and 63 parts of water are ground in a ball mill for 20 hours. The foamy slurry so obtained yields on standing a paste of low viscosity. This paste, which contains 60% of DDT by weight, is non-caked and water-dispersible after 19 days' storage at 55° C.

In the last three of the foregoing examples, some or all of the protective colloid can be omitted in the ball mill operation and added later, thereby preventing the viscosity of the system from being unduly high.

The successful production of the improved DDT compositions described herein is based on the discovery that through the use of preground solid DDT in the procedure described herein there can be obtained aqueous suspensions or pastes which contain high proportions of DDT but which, unlike the previously known compositions containing more than a relatively small amount of the DDT, do not cake. Thus, if molten DDT is used, there is obtained an emulsion of super-cooled DDT in the aqueous phase. The DDT tends to crystallize eventually, and when the DDT content is as high as about 30% the adjacent spheres of super-cooled DDT tend to form intercrystalline aggregates. This process occurs throughout the emulsion with the result that gelling or caking takes place by reason of the fact that a firm structure of intergrown crystals is produced. On the other hand the initial product of the present invention is a concentrated suspension of DDT crystals in an aqueous phase containing water, protective colloid, and surface-active agent. Point to point contact of DDT particles in this suspension does not occur because the water and protective colloid are present and separate the crystals. The suspension is consequently fluid or at least plastic because the DDT crystals are able to move independently of one another.

The DDT used in the aqueous concentrates of this invention may be either the technical grade, which has no very definite melting point but is characterized by a setting point of about 88-90° C.; or the relatively pure material, melting at 102° C. or above; or DDT which has been recrystallized from a suitable solvent such as ethanol and has a melting point of 106° C. or higher. Technical DDT contains about 75% 1,1,1 - trichloro - 2,2-bis(p-chlorophenyl)ethane; see Haller et al. J. Am. Chem. Soc. 67, 1591, (1945). Technical DDT is entirely satisfactory for most uses, but DDT melting at 102° C. or above is preferred if the maximum heat stability is desired. Stable pastes can be prepared with DDT of relatively coarse particle size, e. g., up to 50 microns or even more; however, when the pastes are to be diluted for use as insecticidal sprays, it is desirable to employ finely divided DDT of particle size below 20 microns, preferably under 10 microns. Finely divided DDT can be made by dry disintegration of the solid in any suitable device such as an air-attrition mill or a hammer mill, or by wet disintegration in a ball mill. Stable pastes containing up to 75% and even 80% of DDT can be prepared through use of the most effective suspending and surface-active agents.

The water-soluble polymeric protective colloid, apparently through its thickening effect, serves as an anti-caking or suspending agent, thus preventing sedimentation and flocculation, and it is therefore an essential component of the formulations of this invention. In order that this desired thickening effect be obtained at a concentration sufficiently low not to be detrimental to other desired properties, the protective colloid should be a water-soluble polymeric material whose aqueous solutions have a certain minimum viscosity (at least 10 centipoises at 25° C. and 10% concentration), and the particular polymer chosen should be employed in an amount (usually from 0.2% to about 10%, and more often from about 0.2% to about 5%, of the water in the composition) which will impart to the aqueous phase of the paste, exclusively of the surface-active agent, a viscosity at 25° C. of from about 10 to 500 centipoises. The nature of the water-soluble polymeric protective colloid (in terms of its viscosity in aqueous solutions), and its concentration in the composition, are thus two interdependent factors which must be properly correlated, i. e., balanced one against the other, in formulating the concentrated aqueous DDT pastes which are the objective of the invention.

Suitable water-soluble polymeric protective colloids, in addition to those mentioned in the examples, include sodium alginate, locust bean gum, glue, methylcellulose, sodium cellulose glycolate, etc. The best results are obtained with hydroxylated polymers, of which polyvinyl alcohol (i. e., water-soluble partly or completely hydrolyzed polyvinyl acetate) and methylcellulose are the preferred examples. It will be noted that the hydroxylated polymers, in addition to being protective colloids, can frequently serve as the sole or auxiliary surface-active agents. This double function of the water-soluble hydroxylated polymer is illustrated in Example III.

Any surface-active agent capable of dispersing DDT in water in the presence of the protective colloid is suitable. Experience has shown that the most effective surface-active agents fall in the following classes: alkali salts of alkylated hydrocarbon sulfonic acids, e. g., sodium petroleum sulfonate, sodium lignin sulfonate, "Aresklene 400" (dibutylphenylphenol sodium disulfonate), the "Nacconols" (alkylated benzene sodium sulfonates), etc.; the hydroxylated polymers, e. g., polyvinyl alcohol, methylcellulose, etc.; and the polyethers such as "Triton N-100" and "Triton-770." The surface-active agent is used in amounts of about 0.1% to 10%, based on the weight of the DDT, and preferably within the range of 0.5% to 10%.

The aqueous concentrates of this invention vary in consistency from relatively fluid suspensions or slurries to thick pastes, depending on the amount of DDT present and on the kind and concentration of the thickening agent. They are readily dispersible in additional water with the simplest kind of stirring equipment, such as a hand paddle. Since the necessity for high speed stirring equipment is eliminated, these concentrates are well adapted for dilution to normal spraying concentration in the field by unskilled operators. The pastes of this invention have the further advantage of providing the users with preground DDT containing all the ingredients necessary for the preparation of dilute insecticidal formulations. Furthermore, the invention provides concentrates which can be made from a lower grade of DDT than is generally possible with non-caking, water-dispersible DDT powders. The pastes are extremely stable under normal summertime shipping and storing conditions, and are free from the inconvenience of dusting.

As many apparently widely different embodiments of this invention may be made without departing from the spirit and scope thereof, it is to be understood that I do not limit myself to the specific embodiments thereof except as defined in the appended claim.

I claim:

An aqueous water-dispersible paste comprising a blend of ingredients comprising water, finely-divided DDT of at least technical grade in purity in amount of at least 50% of said paste, a surface-active agent in amount of from 0.1% to 10% by weight of the DDT, and polyvinyl alcohol in amount of from 0.2% to 10% by weight of the water and in amount sufficient to give to the aqueous phase, exclusive of said surface-active agent, a viscosity of at least 10 centipoises at 25° C., said polyvinyl alcohol having a viscosity of at least 10 centipoises in 10% aqueous solution at 25° C.

ISAAC F. WALKER.

REFERENCES CITED

The following references are of record in the file of this patent:

UNITED STATES PATENTS

| Number | Name | Date |
| --- | --- | --- |
| 2,387,336 | Littler | Oct. 23, 1945 |
| 2,407,486 | Flenner et al. | Sept. 10, 1946 |
| 2,423,457 | Lynn et al. | July 8, 1947 |

FOREIGN PATENTS

| Number | Country | Date |
| --- | --- | --- |
| 547,871 | Great Britain | Sept. 15, 1942 |
| 547,874 | Great Britain | Sept. 15, 1942 |

OTHER REFERENCES

Industrial & Engineering Chem., April 1942, pages 490 to 493.